United States Patent
Hanauye et al.

[11] 3,920,846
[45] Nov. 18, 1975

[54] NOVEL INSECTICIDES AND METHOD FOR EXTERMINATING LARVAE OF MOSQUITOES THEREWITH

[75] Inventors: Kunio Hanauye, Nagoya; Mitsuhiro Iwasa, Tokai; Tsutomu Takase; Mizuo Ito, both of Nagoya; Yoshio Sato, Koganei; Teruhiko Toyama, Fujisawa; Osamu Morikawa; Takamitsu Imai, both of Chigasaki, all of Japan

[73] Assignee: Mitsui Toatsu Chemicals, Incorporated, Tokyo, Japan

[22] Filed: May 28, 1974

[21] Appl. No.: 473,573

[30] Foreign Application Priority Data
May 28, 1973  Japan.............................. 48-58558

[52] U.S. Cl. ............................................. 424/346
[51] Int. Cl.² ...................... A01N 9/00; A01N 9/26
[58] Field of Search.................. 424/346; 260/619 R

[56] References Cited
UNITED STATES PATENTS

| | | | |
|---|---|---|---|
| 1,587,077 | 6/1926 | Kropp et al.......................... | 424/346 |
| 2,248,831 | 7/1941 | Stillson et al. .................. | 260/619 R |
| 2,297,388 | 9/1942 | Böhler ................................ | 424/346 |
| 2,535,015 | 12/1950 | Johnson et al...................... | 424/346 |
| 3,183,273 | 5/1965 | Spacht ............................ | 260/619 R |
| 3,234,290 | 2/1966 | Rocklin.............................. | 260/620 |
| 3,702,893 | 11/1972 | Fuchsman........................... | 424/346 |

*Primary Examiner*—Albert T. Meyers
*Assistant Examiner*—D. W. Robinson
*Attorney, Agent, or Firm*—Fisher, Christen & Sabol

[57] ABSTRACT

Insecticides containing as active agent an insecticidally effective amount of a compound represented by the following general formula I

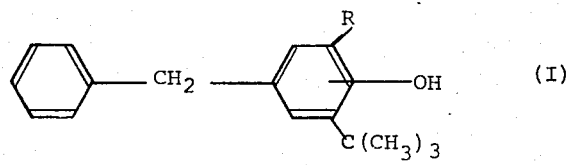

wherein R is hydrogen or t-butyl, with the proviso that the hydroxyl group is in the ortho position with respect to R and at least one t-butyl group is present in the ortho position with respect to the hydroxyl group, are provided. They are effective in combatting larval forms of mosquitoes.

5 Claims, No Drawings

NOVEL INSECTICIDES AND METHOD FOR EXTERMINATING LARVAE OF MOSQUITOES THEREWITH

BACKGROUND OF THE INVENTION

1. Field of the Invention

The present invention relates to insecticides and more particularly to compositions which exhibit excellent insecticidal activity against larvae of mosquitoes and to methods for exterminating larvae of mosquitoes.

2. Description of the Prior Art

In recent years, the use of agricultural chemicals has caused no small amount of public nuisance and pollution of the environment such that serious social problems have been raised. Accordingly, it has particularly been desired to develop an insecticide which is able to selectively exterminate insect pests, but which has no harmful effect on other organisms.

SUMMARY OF THE INVENTION

It is a primary object of the present invention to provide novel insecticidal compositions.

It is another object of the present invention to provide such insecticidal compositions which are selectively active against the larvae of mosquitoes.

It is a further object of the present invention to provide an improved method of exterminating larvae of mosquitoes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. It has been found that the above objects can be attained by practicing the present invention.

As the result of extensive study it has been found that compounds represented by the following general formula I

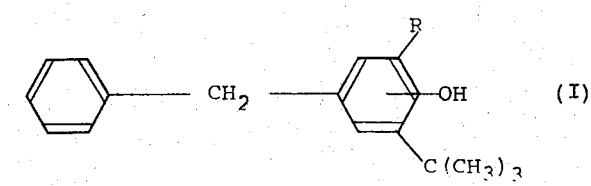

wherein R is hydrogen or t-butyl, with the proviso that the hydroxyl group is located in the ortho position with respect to R and at least one t-butyl group is present in the ortho position with respect to the hydroxyl group, exhibit excellent insecticidal activity against larvae of mosquitoes and are therefore useful as insecticides. The present invention has been accomplished on the basis of this finding. The novel insecticides of the present invention contain as active ingredient an insecticidally effective amount of a compound of the general formula I. Furthermore, the compounds of the present invention are also useful in combatting larvae of mosquitoes which have become resistant to organic chlorine or phosphorus containing insecticides.

DESCRIPTION OF THE PREFERRED EMBODIMENTS

Examples of the insecticidally active compounds in accordance with the present invention are illustrated in the following table.

Table 1

| Compound | Chemical Formula | M.P. (°C.) | Chemical shifts in NMR ($\tau$ values, solvent: $CCl_4$) |
|---|---|---|---|
| Compound I | ⌬—CH₂—⌬(—C(CH₃)₃)(—OH)(—C(CH₃)₃) | 58–59 | 2.82 (5H)<br>3.14 (2H)<br>5.13 (1H)<br>6.19 (2H)<br>8.60 (18H) |
| Compound II | ⌬—CH₂—⌬(—OH)(—C(CH₂)₃) | liquid | 2.87 (5H)<br>3.00–3.72 (3H)<br>5.51 (1H)<br>6.18 (2H)<br>8.63 (9H) |
| Compound III | ⌬—CH₂—⌬(OH)(—C(CH₃)₃)(—C(CH₃)₃) | 61–62 | 2.84 (5H)<br>2.92–3.14 (2H)<br>5.67 (1H)<br>6.10 (2H)<br>8.64 (9H)<br>8.70 (9H) |

Illustrative syntheses of the compounds of the present invention are as follows:

SYNTHESIS 1

A 100 ml autoclave was charged with 18.4 g of p-benzylphenol and 1 g of aluminum isopropoxide and the reaction carried out at 120°C. to obtain aluminum benzylphenoxide. To this product was added 11.2 g of liquid isobutylene and the reaction mixture was raised to a temperature of 136°C. with stirring and allowed to react for about 8 hours. Then the reaction mixture was extracted with ether to give mixtures of compounds I and II of Table 1. From the mixture, each of compounds I and II was isolated by a column chromatography (silica gel/cyclohexane).

SYNTHESIS 2

10.3 g. of 2,4-di-t-butylphenol was dissolved in an appropriate amount of toluene. Then 2 g of sodium hydroxide dissolved in a small amount of water was added and the reaction was carried out under dehydration by an azeotrope of toluene and water at 105°–110°C. to give the sodium salt. Before the dehydration was complete and while the toluene still remained, 12.6 g of benzylchloride was added dropwise at 100°C. with stirring to continue the reaction for 2 hours. The reaction mixture was then distilled under reduced pressure to give a fraction of 127° to 137°C./2 to 3 mmHg, which fraction was further purified by a column chromatography to obtain compound III.

The compounds of the present invention are used in association with (mixed with), and preferably homogeneously dispersed in, one or more compatible insecticidally-acceptable carrier substance in accordance with any manner usually employed in formulating agricultural and insecticidal chemicals. The term "compatible insecticidally-acceptable carrier substance" as used herein has a broad definition and signifies carrier substances of the type generally accepted in the art as being suitable for use in insecticidal compositions and which are compatible with the active ingredient compound of general formula I. The term thus includes both liquids and solids, e.g., carriers, diluents, solvents, adjuvants such as spreaders, emulsifiers, suspending agents, stabilizers, synergists or the like, and other insecticides, bactericides and herbicides, etc. The insecticidal compositions in accordance with the present invention thus include solutions, emulsions, suspensions, dispersible (wettable) powders, emulsifiable concentrates, granular formulations including microcapsules, and dusts. All of these compositions comprise the compound of general formula I in dispersed or readily dispersible form and a carrier substance, with or without adjuvants. In general, selective extermination of mosquito larvae is obtained by applying an effective amount of a compound of formula I to said larvae.

The insecticidal efficacy of the compounds of formula I is of high order and they can be applied at relatively low rates for controlling survival, pupation and/or emergence of mosquito larvae. Illustratively, the compounds of formula I give complete or substantially complete suppression of mosquito larvae at rates of about 0.01 to 10 ppm (parts per million) in water. Little or no adverse effect is apparent to other insects, mammals, aquatic animals or plants at these and even somewhat higher rates of application. It will be understood that a choice of concentration of active ingredient depends upon the method of application as well as the type of composition. The concentration of active ingredient in the dispersible powder and the emulsifiable concentrate formulations from which aqueous compositions can be prepared may be as high as 99.5 percent by weight. The concentration of active ingredient in the granular and dust formulations of the present invention can vary from about 0.25 percent to about 80 percent by weight or more, but advantageously is of the order of 0.5 to 20 percent.

The granular carrier substance may be, for example, vermiculite, pyrophyllite or attapulgite. The active ingredient may be dissolved in a volatile solvent such as acetone methanol, benzene, and the like, and sprayed on the granular carrier substance as it is mixed and tumbled and the granules are then dried. The granular carrier substance can range in particle size from about 10 to about 60 mesh, preferably about 30 to about 60 mesh.

The insecticidal dust compositions are prepared with a solid pulverulent carrier substance which maintains the compositions in a dry, free-flowing state. The active ingredient may be ground with the carrier substance or the active ingredient may be dissolved in a volatile organic solvent of the kinds indicated above and then sprayed on the carrier substance so as to assure thorough distribution. The mixture is then dried and milled to the desired size, e.g., less than about 60 microns. Solid carrier substances that can be used in the dust compositions of the present invention include the natural clays such as China clay and bentonite, minerals in the natural state such as talc, pyrophyllite, quartz, diatomaceous earth, fuller's earth, chalk and rock phosphate, and the chemically modified minerals such as washed bentonite, precipitated calcium phosphate, carbonate or silicate and colloidal silica.

The dust compositions of the present invention can be rendered dispersible by incorporating a surfactant therein. The resulting dispersible powder can be dispersed in water to any desired concentration. Conveniently, the dispersible powders are formulated with higher concentration of active ingredient than the dust compositions per se, for example, up to 90 percent by weight, preferably about 10 to about 80 percent. Surfactants useful in preparing the powdered compositions may be either non-ionic, anionic, or cationic in nature. Suitable non-ionic surfactants include glycerol monostearate, sorbitan monolaurate, sorbitan monopalmitate, polyethylene glycol, polyoxyethylene laurylether, polyoxyethylene octylphenylether, polyoxyethylene nonylphenyl ether and polyoxyethylene isooctylphenylether. Suitable anionic surfactants include potassium laurate, natrium octylsulphate, natrium laurylsulphate, natrium tetradecyl sulphate, natrium octylsulphonate, natrium n-octylbenzene sulphonate, natrium n-hexadecylbenzene sulphonate and natrium tetrapropylene benzene sulphonate. Suitable cationic surfactants include n-octylamine hydrochloride, n-dodscyl trimethyl ammonium bromide, dioctyl dimethyl ammonium chloride, and n-dodecyl pyridinium chloride.

The compounds of the present invention can also be used without a solid carrier substance. Preferably they are ground with and/or dissolved in a suitable organic solvent which preferably is immiscible in water so that an emulsion of the solvent in water can be prepared. One or more carrier solvent substances with or without a co-solvent can be used in order to obtain concentrated solutions of the active ingredient.

The emulsifiable concentrates of the present invention can be prepared by grinding the active ingredient and a surfactant with a substantially water-immiscible solvent carrier substance or by dissolving the active ingredient and surfactant in the solvent. Suitable solvents include aromatic hydrocarbons such as benzene, xylene, toluene, solvent naphtha, naphthalene, and kerosine. If desired, a co-solvent such as methanol, ethanol, isopropanol, isophorone, and tetrahydrofuran. can be included with the solvent carrier substance in order to enhance solubility of the active ingredient. Aqueous emulsions are then prepared by mixing with water to give any desired concentration of the active ingredient. Surfactants which can be employed in the emulsifiable concentrates are those types disclosed above. Mixtures of surfactants can be employed if desired. Advantageously, the concentration of active ingredient in the emulsifiable concentrates can range from about 5 to about 50 percent by weight, preferably from about 10 to about 50 percent by weight.

The following example is illustrative of the insecticidal compositions of the present invention.

EXAMPLE 1

50 parts of compound I, 40 parts of benzene and 10 parts of polyoxyethylenenonylphenylether were mixed together and ground to give 100 parts of an emulsifiable concentrate.

The insecticidal effectiveness of the compositions of the present invention are illustrated in the following examples:

EXAMPLE 2

A. 180 ml of stored water was placed in a glass pot having a diameter of 9 cm and a height of 9 cm. An emulsifiable concentrate of test compound I (active ingredient) prepared according to the procedure of Example 1 was diluted with water and 20 ml of the resultant emulsion added to the glass pot to give a total volume of 200 ml. The amount of emulsifiable concentrate used was calculated to result in a concentration of 100 ppm in the water. 10 larvae of fourth instar of *Culex pipiens pallens* were released into the pot maintained at a constant temperature of 25°C. and fed with an appropriate amount of Ebios (registered Trade Mark) which is a powdered yeast. The numbers of surviving larvae, pupae and emerged adults were observed daily after release of the larvae into the pots and the results are shown in the following Table 2.

B. The procedure of paragraph A was repeated three times with the exception that the amounts of emulsifiable concentrate used were calculated to result in concentrations of 10 ppm, 1 ppm and 0.1 ppm, respectively, in the water. The results are also shown in the following Table 2.

C. The procedures of paragraphs A and B above were repeated for Test Compounds II and III and the results are shown in Table 2.

Table 2

| Test Compound | Conc. of test compound in rearing water (ppm) | After 1 day | | | |
|---|---|---|---|---|---|
| | | %survival of larvae | %mortality of larvae | %pupation | %emergence |
| Compound I | 100 | 70 | 30 | 0 | 0 |
| | 10 | 50 | 50 | 0 | 0 |
| | 1 | 100 | 0 | 0 | 0 |
| | 0.1 | 100 | 0 | 0 | 0 |
| Compound II | 100 | 60 | 40 | 0 | 0 |
| | 10 | 95 | 5 | 0 | 0 |
| | 1 | 100 | 0 | 0 | 0 |
| | 0.1 | 100 | 0 | 0 | 0 |
| Compound III | 100 | 100 | 0 | 0 | 0 |
| | 10 | 100 | 0 | 0 | 0 |
| | 1 | 100 | 0 | 0 | 0 |
| | 0.1 | 100 | 0 | 0 | 0 |
| Blank test | — | 100 | 0 | 0 | 0 |

| Test Compound | Conc. of test compound in rearing water (ppm) | After 2 days | | | |
|---|---|---|---|---|---|
| | | %survival of larvae | %mortality of larvae | %pupation | %emergence |
| Compound I | 100 | 30 | 70 | 0 | 0 |
| | 10 | 35 | 65 | 0 | 0 |
| | 1 | 55 | 45 | 0 | 0 |
| | 0.1 | 70 | 30 | 0 | 0 |
| Compound II | 100 | 30 | 70 | 0 | 0 |
| | 10 | 80 | 20 | 0 | 0 |
| | 1 | 65 | 35 | 0 | 0 |
| | 0.1 | 70 | 5 | 25 | 0 |
| Compound III | 100 | 90 | 10 | 0 | 0 |
| | 10 | 100 | 0 | 0 | 0 |
| | 1 | 100 | 0 | 0 | 0 |
| | 0.1 | 100 | 0 | 0 | 0 |
| Blank test | — | 95 | 5 | 0 | 0 |

| Test Compound | Conc. of test compound in rearing water (ppm) | After 3 days | | | |
|---|---|---|---|---|---|
| | | % survival of larvae | % mortality of larvae | % pupation | % emergence |
| Compound I | 100 | 25 | 75 | 0 | 0 |
| | 10 | 20 | 80 | 0 | 0 |
| | 1 | 40 | 60 | 0 | 0 |
| | 0.1 | 40 | 60 | 0 | 0 |
| Compound II | 100 | 15 | 85 | 0 | 0 |
| | 10 | 65 | 35 | 0 | 0 |
| | 1 | 35 | 65 | 0 | 0 |
| | 0.1 | 55 | 25 | 20 | 0 |
| Compound III | 100 | 60 | 40 | 0 | 0 |
| | 10 | 95 | 0 | 5 | 0 |

Table 2-continued

| Test Compound | Conc. of test compound in rearing water (ppm) | After 1 day | | | |
|---|---|---|---|---|---|
| | | %survival of larvae | %mortality of larvae | %pupation | %emergence |
| | 1 | 80 | 15 | 5 | 0 |
| | 0.1 | 95 | 0 | 5 | 0 |
| Blank test | — | 80 | 10 | 10 | 0 |

| Test Compound | Conc. of test compound in rearing water (ppm) | After 4 days | | | |
|---|---|---|---|---|---|
| | | %survival of larvae | %mortality of larvae | %pupation | %emergence |
| Compound I | 100 | 15 | 85 | 0 | 0 |
| | 10 | 20 | 80 | 0 | 0 |
| | 1 | 15 | 85 | 0 | 0 |
| | 0.1 | 10 | 90 | 0 | 0 |
| Compound II | 100 | 5 | 95 | 0 | 0 |
| | 10 | 60 | 40 | 0 | 0 |
| | 1 | 30 | 65 | 5 | 0 |
| | 0.1 | 15 | 30 | 50 | 5 |
| Compound III | 100 | 60 | 40 | 0 | 0 |
| | 10 | 35 | 65 | 0 | 0 |
| | 1 | 65 | 25 | 10 | 0 |
| | 0.1 | 35 | 20 | 45 | 0 |
| Blank test | — | 50 | 10 | 40 | 0 |

| Test Compound | Conc. of test compound in rearing water (ppm) | After 5 days | | | |
|---|---|---|---|---|---|
| | | %survival of larvae | %mortality of larvae | %pupation | %emergence |
| Compound I | 100 | 15 | 85 | 0 | 0 |
| | 10 | 20 | 80 | 0 | 0 |
| | 1 | 5 | 95 | 0 | 0 |
| | 0.1 | 0 | 100 | 0 | 0 |
| Compound II | 100 | 0 | 100 | 0 | 0 |
| | 10 | 55 | 45 | 0 | 0 |
| | 1 | 10 | 75 | 15 | 0 |
| | 0.1 | 5 | 30 | 50 | 15 |
| Compound III | 100 | 35 | 75 | 0 | 0 |
| | 10 | 5 | 95 | 0 | 0 |
| | 1 | 55 | 35 | 10 | 0 |
| | 0.1 | 10 | 30 | 50 | 10 |
| Blank test | — | 0 | 15 | 75 | 10 |

| Test Compound | Conc. of test compound in rearing water (ppm) | After 6 days | | | |
|---|---|---|---|---|---|
| | | %survival of larvae | %mortality of larvae | %pupation | %emergence |
| Compound I | 100 | 15 | 85 | 0 | 0 |
| | 10 | 20 | 80 | 0 | 0 |
| | 1 | 5 | 95 | 0 | 0 |
| | 0.1 | — | — | — | — |
| Compound II | 100 | — | — | — | — |
| | 10 | 55 | 45 | 0 | 0 |
| | 1 | 0 | 85 | 15 | 0 |
| | 0.1 | 0 | 30 | 45 | 25 |
| Compound III | 100 | 20 | 70 | 10 | 0 |
| | 10 | 0 | 100 | 0 | 0 |
| | 1 | 40 | 50 | 5 | 5 |
| | 0.1 | 0 | 30 | 45 | 25 |
| Blank test | — | 0 | 15 | 35 | 50 |

| Test Compound | Conc. of test compound in rearing water (ppm) | After 7 days | | | |
|---|---|---|---|---|---|
| | | % survival of larvae | %mortality of larvae | %pupation | %emergence |
| Compound I | 100 | 5 | 95 | 0 | 0 |
| | 10 | 20 | 80 | 0 | 0 |
| | 1 | 0 | 100 | 0 | 0 |
| | 0.1 | — | — | — | — |
| Compound II | 100 | — | — | — | — |
| | 10 | 20 | 80 | 0 | 0 |
| | 1 | 0 | 85 | 15 | 0 |
| | 0.1 | 0 | 30 | 10 | 60 |
| Compound III | 100 | 10 | *90 | 0 | 0 |
| | 10 | — | — | — | — |
| | 1 | 20 | 70 | 0 | 10 |
| | 0.1 | 0 | 30 | 10 | 60 |
| Blank test | — | 0 | 15 | 10 | 75 |

Table 2-continued

| Test Compound | Conc. of test compound in rearing water (ppm) | After 1 day | | | |
|---|---|---|---|---|---|
| | | %survival of larvae | %mortality of larvae | %pupation | %emergence |

| Compound | Conc. of test compound in rearing water (ppm) | After 8 days | | | |
|---|---|---|---|---|---|
| | | % survival of larvae | %mortality of larvae | %pupation | %emergence |
| Compound I | 100 | 5 | 95 | 0 | 0 |
| | 10 | 15 | 85 | 0 | 0 |
| | 1 | — | — | — | — |
| | 0.1 | — | — | — | — |
| Compound II | 100 | — | — | — | — |
| | 10 | 15 | 85 | 0 | 0 |
| | 1 | 0 | 85 | 10 | 5 |
| | 0.1 | 0 | 30 | 0 | 70 |
| Compound III | 100 | 0 | 100 | 0 | 0 |
| | 10 | — | — | — | — |
| | 1 | 10 | 80 | 0 | 10 |
| | 0.1 | 0 | 30 | 5 | 65 |
| Blank test | — | 0 | 15 | 0 | 85 |

In Table 2, the percent survival of larvae, percent mortality of larvae, percent pupation and percent emergence all are based on the number of larvae released into the pot, the number of larvae which died just after pupation being included in the number of dead larvae. The rearing water was kept at a constant volume of 200 ml over the entire test period. The values in the table represent the average of two identical tests.

As can be seen from the test results in Table 2, the insecticides of the present invention are, unlike ordinary insecticides, very similar in insecticidal activity to juvenile hormones. This is apparent, for example, from the fact that pupation of the larvae was retarded, so the larvae died just after pupation or that the dead pupae did not brown like normal pupae.

EXAMPLE 3

A. To a 1/2000 are pot (water depth 20 cm) in which 2000 to 3000 of first to fourth instars of larvae of *Culex pipiens pallens* were living, was added 5 ml of an emulsifiable concentrate of the test compound I prepared in accordance with the procedure of Example 1, and the pot was allowed to stand outdoors during the summer months. Subsequently thereto, the number of surviving larvae pupae and emerged adults were observed. The results one month after treatment are shown in the following Table 3.

B. The procedure of paragraph A above was repeated with the exception that 0.5 ml of the emulsifiable concentrate was added to the pot. The results are also shown in the following Table 3.

C. The procedures of paragraphs A and B above were repeated with the exception that an emulsifiable concentrate of a control test compound, which was 2,4-di-tert-butyl-4-cumylphenol, was used. The results are shown in Table 3.

Table 3

| Test Compound | Quantity of emulsion of test compound (ml) | One month after treatment | | |
|---|---|---|---|---|
| | | %Survival of larvae | % pupation | % emergence |
| Compound I | 5 | 0 | 0 | 0 |
| | 0.5 | 0 | 0 | 0 |
| Control | 5 | 0 | 0 | 0 |
| | 0.5 | 0 | 65 | 60 |
| Blank test | | 0 | 100 | 100 |

In Table 3, the percent survival of larvae, percent pupation and percent emergence are all based on the number of larvae released into the pot. Over the entire test period, the rearing water in the pot was kept at a constant level while partly being refreshed at the rate of 100 ml/hr.

As is apparent from the results in Table 3, the active ingredient of the insecticide in accordance with the present invention exhibits superior insecticidal activity compared to the control compound.

Furthermore, the compounds in accordance with the present invention exert specific insecticidal action only on the larvae of mosquitoes, and they have very low toxicity and little harmful effect on other insects, mammals, aquatic animals and plants. For example, Compound I exhibited no toxic effect on killifish (*Oryzias latipas*) exposed for 72 hours to 100 ppm concentration thereof or on mice given 300 mg/kg orally.

With respect to microbiological degradability (biodegradability), consistant with the generally accepted fact that the degradability of an aromatic compound is enhanced by the presence of a hydroxy or carboxy group, the compounds in accordance with the present invention have very good degradability. In addition, the compounds of the present invention consist only of carbon, hydrogen and oxygen, so that their decomposition products cause little environmental pollution.

As described in the foregoing, the compounds of the invention, beside being effective insecticides against the larval form of mosquitoes, fulfill substantially all the requirements for the prevention of chemical hazards to plants and other animals and for control of environmental pollution.

The insecticidal compositions of the present invention can be applied to the mosquito larvae in any conventional manner.

We claim:

1. A method for exterminating larvae of mosquitoes which comprises applying to said larvae an insecticidally effective amount of a compound of the general formula

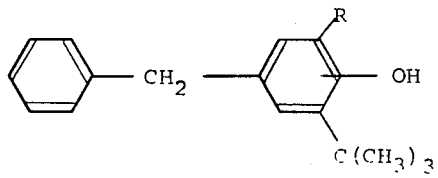

wherein R is hydrogen or t-butyl, with the proviso that the hydroxyl group is in the ortho position with respect to R and at least one t-butyl group is present in the ortho position with respect to the hydroxyl group.

2. The method of claim 1 wherein said compound is 3,5-di-t-butyl-4-hydroxy-diphenylmethane.

3. The method of claim 1 wherein said compound is 3,5-di-t-butyl-2-hydroxy-diphenylmethane.

4. The method of claim 1 wherein said compound is 3-t-butyl-4-hydroxy-diphenylmethane.

5. The method of claim 1 wherein said compound is applied as an aqueous composition containing about 0.01 to 10 ppm of said compound.

* * * * *